US Patent [19] 4,193,616
Sarson et al. [45] Mar. 18, 1980

[54] QUICK CONNECT FITTING

[75] Inventors: Charles R. Sarson, Euclid; Richard C. Acker, Chagrin Falls, both of Ohio

[73] Assignee: Dana Corporation, Toledo, Ohio

[21] Appl. No.: 906,940

[22] Filed: May 18, 1978

[51] Int. Cl.² ........................................... F16L 37/08
[52] U.S. Cl. ..................................... 285/39; 285/321; 285/356; 285/DIG. 22
[58] Field of Search ................. 285/321, 39, DIG. 22, 285/356, 353

[56] References Cited

U.S. PATENT DOCUMENTS

| | | | |
|---|---|---|---|
| 2,226,826 | 12/1940 | Miller | 285/321 X |
| 2,944,840 | 7/1960 | Wiltse | 285/321 X |
| 3,439,944 | 4/1969 | Leutenegger | 285/321 |
| 3,447,819 | 6/1969 | Borsum et al. | 285/321 X |
| 3,637,239 | 1/1972 | Daniel | 285/321 X |
| 3,871,691 | 3/1975 | Takagi et al. | 285/321 |
| 4,133,564 | 1/1979 | Sarson et al. | 285/321 |

Primary Examiner—Thomas F. Callaghan
Attorney, Agent, or Firm—Pearne, Gordon, Sessions

[57] ABSTRACT

A quick connect coupling is disclosed which includes a body assembly providing a tube end receiving passage having an inner cylindrical seal portion and an internal, annular groove outwardly of the seal portion. A tube end portion is proportioned to fit into the tube receiving passage with a close fit and has a peripheral seal groove located within the seal portion and a peripheral lock ring groove within the internal groove when the end portion is inserted into the passage. A resilient seal is carried in the seal groove and a compressible lock ring having a circular cross section is located in the lock ring groove. The lock ring groove has a sidewall which is adapted to engage the clip and apply outwardly directed radial pressure and axially directed longitudinal pressure to the lock ring to urge the lock ring into longitudinal contact with a wall of the internal groove and to urge the lock ring away from the bottom of the lock ring groove upon the application of an axially outwardly directed pulling force on the tube.

14 Claims, 3 Drawing Figures

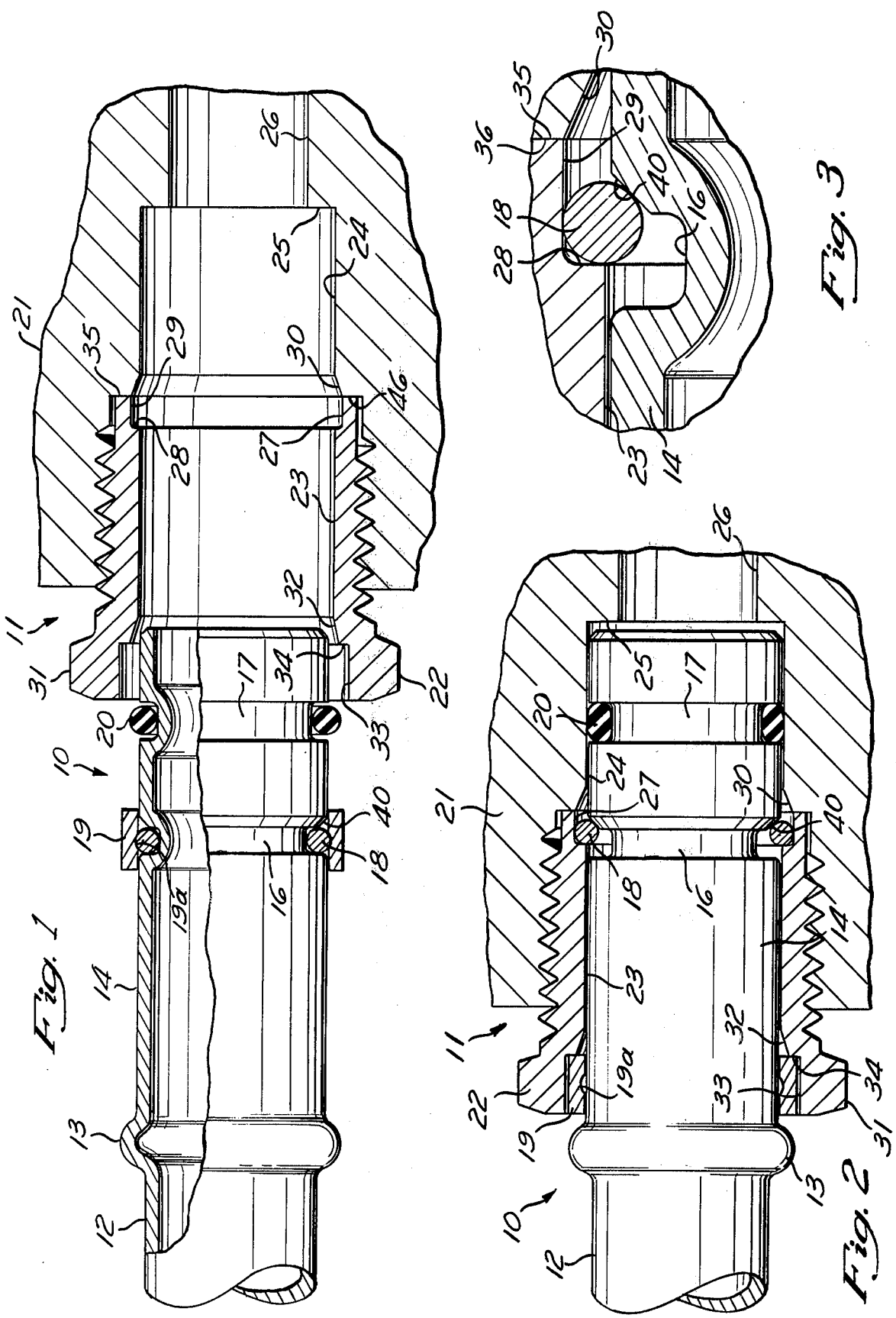

QUICK CONNECT FITTING

BACKGROUND OF THE INVENTION

This invention relates generally to tube couplings, and more particularly to a novel and improved quick connect tube coupling.

PRIOR ART

Quick connect couplings allow initial assembly by merely inserting the tube end into the body assembly. Such couplings reduce installation labor costs, substantially eliminate the likelihood of cross threading, and substantially eliminate the improper torqueing of the parts. Such couplings usually provide a resilient seal and a snap lock system which allows the coupling to be initially assembled with threaded parts assembled as a preassembly operation.

In some prior art of quick connect couplings, an adapter ring is mounted on the end of the tube to provide the structure for sealing and locking the coupling. In such structures, it is necessary to provide a fluidtight joint between the adapter ring and the coupling and to provide sufficient structural strength to withstand the various mechanical loads applied to the system. Examples of such structures are described in U.S. Pat. Nos. 3,146,696, granted Apr. 18, 1967, 3,540,760, granted Nov. 17, 1970, and 3,871,691, granted Mar. 18, 1975. Similar structures are also provided in couplings which are not strictly considered quick connect couplings, examples of such couplings being described in U.S. Pat. Nos. 2,521,127, granted Sept. 5, 1950, and 2,935,343, granted May 3, 1960.

Other quick connect couplings avoid the mounting of a separate adapter ring on the end of the tube, but provide radial projections created by deforming the tube material itself. Such projections provide a base for the locking structure and/or the seal system. In many instances, the forming of these projections involves rather drastic deformation of the tube material, and leads to stress concentration zones and weakening of the basic tube structure. Examples of such couplings are described in U.S. Pat. Nos. 2,441,344, granted May 11, 1948; 3,414,299, granted Dec. 3, 1968; 3,584,902, granted June 15, 1971; 3,847,421, granted Nov. 12, 1974; and 3,826,523, granted July 30, 1974.

Another type of quick connect structure is illustrated in U.S. Pat. No. 3,381,983, granted May 7, 1968. Such patent describes a joint or coupling in which the pipe is formed, probably by casting, with a thickened end which is machined to provide the seal and locking structure.

A more acceptable arrangement is shown in copending U.S. patent application, Ser. No. 754,567, filed Dec. 27, 1976 and now U.S. Pat. No. 4,133,564. In that application, there is disclosed a quick connect coupling which comprises a main body portion having a hollow nut threaded therein. The hollow nut is provided with a counterbore at its internal end to form an internal groove for reception of a lock ring. Further according to the teachings of application Ser. No. 754,567, the lock ring has a rectangular cross section, since it was found that a circular cross section lock ring has a greater tendency to jam during final assembly than does a ring having a rectangular cross section. It has also been found that a ring has a tendency to be forced radially inward by the walls of the lock ring receiving groove on the tube working in conjunction with the shoulder of the counterbore in the nut, particularly if the parts are slightly out of tolerance. If the lock ring is forced radially inward, the coupling disengages.

SUMMARY OF THE INVENTION

This invention provides a quick connect fitting having the advantages of the fitting shown and described in U.S. application Ser. No. 754,567 but which provides a more positive locking connection between the fitting members even if the parts are somewhat out of tolerance. Moreover, applicants employ a lock ring having a circular cross section to effect a stronger locking connection and have devised a technique for confining the lock ring within its groove prior to and during installation to prevent jamming of the lock ring.

The coupling includes a hollow threaded nut which is received within a threaded passageway in a body member. The forward end of the nut has a counterbore which serves as an annular groove to receive a locking ring. A tube end is received within the threaded nut and carries a sealing ring in a groove adjacent its forward end and a snap ring received within an annular groove spaced rearwardly from the sealing ring groove. The lock ring is retained entirely within the groove by a sleeve which is slidable on the tube and which covers the lock ring groove. Upon insertion of the tube within the hollow nut, the sleeve is pushed axially away from the snap ring groove as the lock ring enters the hollow nut. Upon further insertion of the tube end, the sealing ring seals against a cylindrical wall within the body while the lock ring enters the annular groove formed by the counterbored end of the hollow nut.

BRIEF DESCRIPTION OF THE DRAWING

FIG. 1 is a side elevation, partially in longitudinal section, illustrating a preferred embodiment of this invention before the tube end assembly is inserted in the body assembly;

FIG. 2 is a side elevation similar to FIG. 1, but illustrating the coupling in the assembled condition; and FIG. 3 is an enlarged, cross sectional view showing the locking connection between the tube end assembly and the body assembly.

DETAILED DESCRIPTION OF THE INVENTION

Referring to the drawings, the illustrated embodiment of this invention includes a tube end assembly 10 and a body assembly 11. The tube end assembly 10 is integrally formed on the end of a piece of tubing 12, preferably formed of work-hardening material. The tubing 12 is deformed in a manner described in copending application Ser. No. 754,567 to provide a smoothly curved, annular rib or projection 13 and an end portion 14 having a diameter greater than the diameter of the tubing 12 and which extends from the rib 13 to the end of the tube end assembly 10.

A pair of peripheral grooves 16 and 17 are formed at axially spaced locations on the end portion 14. The rearwardmost groove 16 is a lock ring groove and contains a compressible lock ring 18 of circular cross section. The lock ring 18 is formed with a circular shape and its ends are shaped so that it can be compressed in the manner indicated in FIG. 1 by an encircling, rigid band 19 to fit down into the groove 16. The rigid band 19 is provided with a shallow groove 19a to prevent accidental dislodgement of the band 19. Positioned in the forwardmost groove 17 is an O-ring seal 20 which operates when the coupling is assembled to provide a fluidtight joint between the body assembly 11 and the tube end assembly 10.

The body assembly 11 includes an integral part 21 of the associated equipment and a tubular nut 22 having a bore 23 coaxial with a tube receiving bore 24 formed in the body member 21. The two bores 23 and 24 are of equal diameter in the illustrated embodiment, and are proportioned to receive the end portion 14 with a close fit. Forward of the bore 24 is a shoulder 25 which extends between the bore 24 and a bore 26.

The tubular nut 22 is formed with a counterbore 27 providing a radial wall 28 and a cylindrical surface 29, which cooperate to receive the lock ring 18 when the coupling is assembled. The counterbore cooperates with the adjacent surface of the body member to define a lock ring receiving internal groove. Forward of the counterbore 27, the body member 21 is formed with a conical camming surface 30 to compress the seal 20 as the seal moves out of the counterbore 27 into the bore 24 in the body member. Such conical surface prevents damage to the seal as the tube end is pressed into the assembled position.

Forward of the tubular nut 22 within a wrenching portion 31 is a camming ramp 32 having an open end formed with a diameter greater than the diameter of the seal 20. This camming ramp 32, like the conical surface 30, compresses the seal 20 as the tube end is pressed into its assembled position. Forward of the camming ramp 32 there is provided a counterbore 33 in the nut 22. The counterbore 33 receives the band 19 as the tube end is inserted in the hollow nut 22. A shoulder 34 of the counterbore 33 holds the band 19 against further travel with the tube and the tube and the lock ring 18 slide forwardly into the bore 23 with no expansion of the lock ring 18 beyond the extent of the open end of the camming ramp 32. The lock ring then moves along the bore 23 until it reaches the counter bore 27. The end of the tube nut 22 is provided with a radial face 35 which engages a shoulder 46 formed in the body member 21 when the tube nut is properly installed and torqued within the body member 21.

In use, the tubular nut 31 is installed in the associated equipment. The tube end 10 is then installed by merely pressing the tube axially in along the tubular nut until the assembled position of FIG. 2 is reached. At such time, the coupling is assembled and is ready for use.

As the tube end is pressed into the tubular nut, the end of the tube is guided along the camming ramp 32 and enters the bore 23. Continued movement toward the assembled position causes the O-ring seal to be compressed inwardly so that it smoothly enters the bore 23 and thereafter the compression ring is stripped of its band 19 by the shoulder 34 so that the ring 18 smoothly enters the bore 27 in a compressed state. As the ring enters the bore, the band 19 is received within the counterbore 33 and tends to remain in the counterbore, but serves no further function in the assembly.

When the assembly has progressed a sufficient amount to position the O-ring seal within the counterbore 27, the O-ring expands back to its uncompressed diameter, but is again compressed as it engages the conical surface 30 so that it smoothly passes into the bore 24.

The completion of the assembly occurs when the snap ring 18 reaches the counterbore 27 and snaps radially out against the cylindrical wall 29 so that it bridges between the radial face 28 and the groove 16. In such condition, the O-ring seal 20 is in sealing engagement with the surface of the bore 24 and provides a fluidtight joint between the tube end assembly 10 and the body member 21. In such position, the lock ring prevents movement of the tube end to the left, as viewed in FIG. 2, and functions to transmit the mechanical loads applied to the tube to the body member 21. Any rearward axial loads or axial loads to the left as viewed in the drawing tend to trap the ring 18 against the shoulder 28 and the cylindrical wall 29 by means of an angularly related sidewall 40 of the groove 16. The sidewall 40 is beveled at an angle of about 45 degrees with respect to the shoulder 28 and with respect to the cylindrical wall 29 so that pressure on the ring by the wall 40 tends to exert an outwardly directed, radial pressure and an axially directed, longitudinal pressure to the ring to urge the ring into longitudinal contact with the shoulder 28 and into radial contact with the wall 29 to urge the ring away from the bottom of the groove 16. This ensures that the ring 18 will not be cammed into the groove upon the application of such axial pressure, to thereby accidentally disengage the coupling. This is particularly important where the various surfaces are slightly out of tolerance.

Although a preferred embodiment of this invention is illustrated, it should be understood that various modifications and rearrangements of parts may be resorted to without departing from the scope of the invention disclosed and claimed herein.

What is claimed is:

1. A quick connect coupling providing a body assembly having a tube end receiving passage with a seal portion and a radially extending wall for positioning a lock ring, and a tube, said tube having a peripheral groove, a snap lock ring bridging between said groove and said radially extending wall operating to lock said end portion in said passage when said end portion is assembled in said passage, seal means separate from said lock ring providing a fluidtight joint between said end portion and body assembly, said body assembly including a body member and a nut threaded to said body member, said radially extending wall being formed on said nut substantially adjacent the inner end thereof, said nut having a counterbore at its inner end, said radially extending wall being provided by the inner end of said counterbore, said nut being threaded to the body member until the inner end of said nut bottoms on said body member, said groove having a side wall adapted to engage said ring and apply outwardly directed radial pressure and axially directed longitudinal pressure to said ring to urge said ring into longitudinal contact with radially extending wall and to urge said ring away from the bottom of said groove upon the application of an axially outwardly directed pulling force on said tube, said lock ring being held within said groove prior to insertion into said passage by a circumferential band slidable along said tube and assembly, said band having an outside diameter greater than the diameter of said tube end receiving passage so that said band is removed from engagement with said lock ring as the lock ring enters the passage.

2. A quick connect coupling according to claim 1, wherein said ring has a circular cross section.

3. A quick connect coupling according to claim 2, wherein said sidewall of said groove is angularly related to said radially extending wall.

4. A quick connect coupling according to claim 3, wherein said sidewall of said groove is angularly related to said radially extending wall at an angle of about 45 degrees.

5. A quick connect coupling comprising a body assembly providing a tube end receiving passage having an annular seal portion and an internal groove outwardly of said seal portion, and a tube end assembly on the end of a tube providing an enlarged, cylindrical end portion proportioned to fit into said tube receiving passage with a close fit, said cylindrical end portion providing a peripheral seal groove located within said seal portion and a peripheral lock ring groove within said internal groove when said end portion is inserted into said passage, a resilient seal in said seal groove, a compressible lock ring in said lock ring groove, said lock ring groove having a sidewall adapted to engage said lock ring and apply outwardly directed radial pressure and axially directed longitudinal pressure to said lock ring to urge said lock ring into longitudinal contact with a wall of said internal groove and to urge said lock ring away from the bottom of said lock ring groove upon the application of an axially directed, outwardly directed pulling force on said tube, said lock ring being held within said peripheral lock ring groove prior to insertion into said passage by a circumferential band slidable along said tube end assembly, said band having an outside diameter greater than the diameter of said tube end receiving passage.

6. A quick connect coupling according to claim 5, wherein said band is provided with an internal groove to retain said band against accidental dislodgement.

7. A quick connect coupling according to claim 5, wherein said tube end receiving passage has a counterbore adapted to receive said band upon insertion of said tube end assembly.

8. A quick connect coupling according to claim 7, wherein said tube end assembly includes a rib adapted to retain said band in said counterbore.

9. A quick connect coupling according to claim 5, wherein said lock ring has a circular cross section.

10. A quick connect coupling according to claim 5, wherein said sidewall of said lock ring groove is angularly related to a sidewall of said internal groove.

11. A quick connect coupling according to claim 5, wherein said sidewall of said lock ring groove is angularly related to said sidewall of said internal groove at an angle of about 45 degrees.

12. A quick connect coupling according to claim 5, wherein said body assembly comprises a body member providing said tube end receiving passage and a tubular nut threedably connected to said body member in alignment with said tube end receiving passage, said nut being formed with a counterbore at its inner end providing said wall of said internal groove.

13. A quick connect coupling according to claim 12, wherein said nut is further formed with a counterbore at its outer end.

14. A quick connect coupling according to claim 13, wherein said tube end assembly includes a rib adapted to retain said band in said counterbore.

* * * * *